Patented Oct. 22, 1940

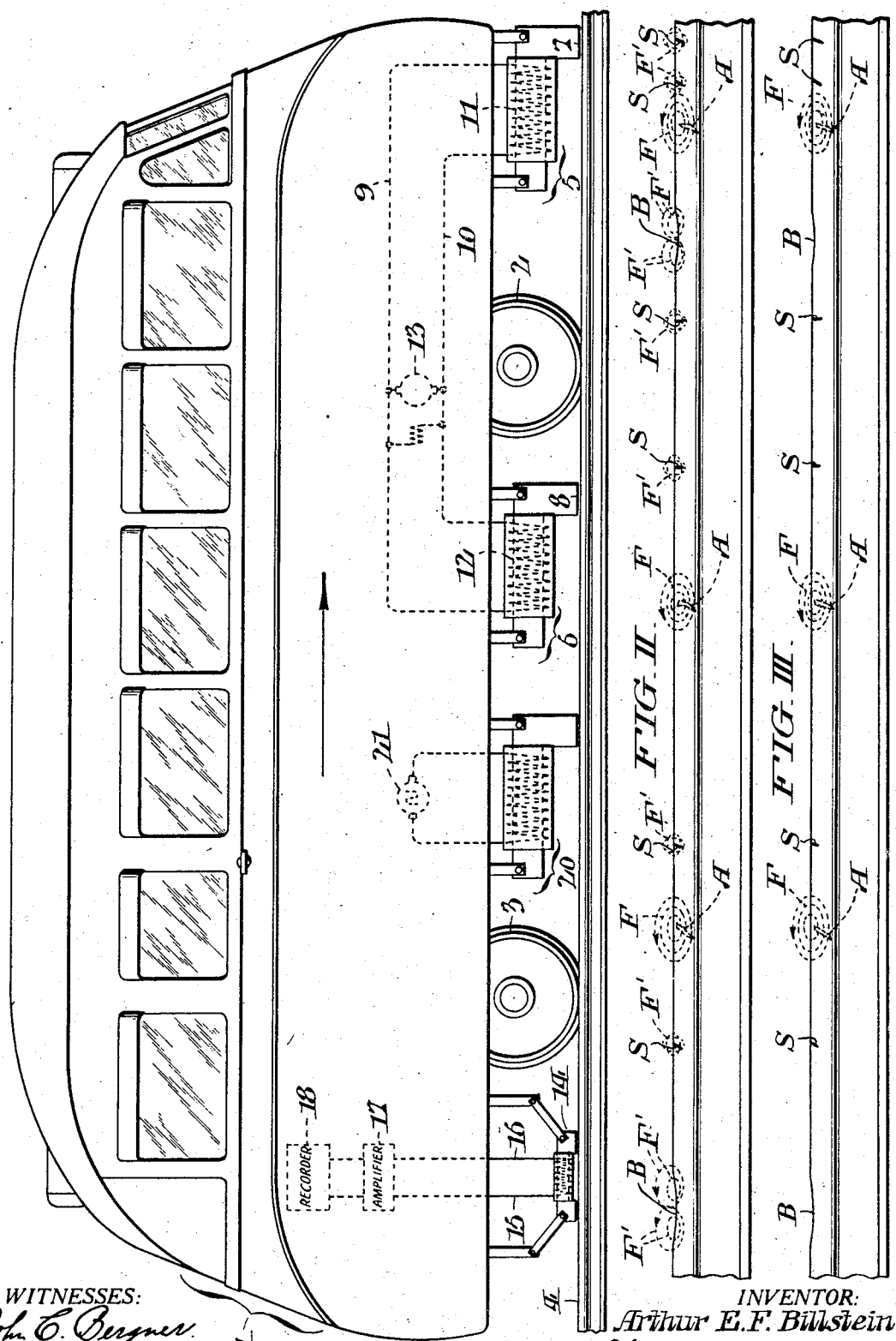

2,218,784

UNITED STATES PATENT OFFICE 2,218,784

RAIL FLAW DETECTING METHOD AND APPARATUS

Arthur E. F. Billstein, Altoona, Pa., assignor to The Pennsylvania Railroad Company, Philadelphia, Pa., a corporation of Pennsylvania Application June 4, 1937, Serial No. 146,343

5 Claims. (Cl. 175—183)

This invention relates to methods of, and apparatus for detecting hidden flaws such as cracks, fissures, hollows, etc., internally of track rails and the like. More especially, my invention has reference to flaw detecting methods and apparatus wherein the rail or other object under test is magnetized for establishment of residual magnetic faces at the regions of the flaws, and for creation in turn of individual magnetic fields locally of these regions; and wherein a magnetically-sensitive exploring element or detector, which, upon being moved along the rail, is electrically affected by the localized residual magnetic fields, and, which through an amplifier, causes the operation of a recorder or other means capable of registering or indicating the impulses received by it. Flaw detection by such method and apparatus is not wholly dependable, since, during initial magnetization of the rail, magnetic fields are also created in the regions of irregularities or imperfections such as wheel burns, scale, shelly spots, etc., at or near the surface of the rails which irregularities or imperfections are recorded together with the internal flaws and are therefore not distinguishable from the flaw indications.

My invention is directed toward overcoming this drawback: that is to say, I aim to prevent the detection and recording of all but the hidden imperfections in the rails. This advantage I realize in practice as hereinafter more fully disclosed, by subjecting the rails, after the initial magnetization thereof and before detection, to a demagnetizing influence which will penetrate only sufficiently deep to eliminate the residual fields due to the surface imperfections or irregularities, without however disturbing the residual fields at the hidden imperfections, so only that the latter will be detected and indicated.

Other objects and attendant advantages will appear from the following detailed description of the attached drawing, wherein Fig. I is a side view of a detector car conveniently incorporating my invention.

Fig. II is a diagrammatic view showing the condition of the rail after magnetization with the induced residual magnetic flux fields in the regions of the internal flaws and in the regions of wheel burns and scale at the rail surface.

Fig. III is a similar view showing the condition of the rail after elimination, according to my invention, of the magnetc flux fields in the regions of the surface irregularities.

The car illustrated in Fig. I of the drawing may be of any suitable design or construction with a closed body 1 and flange wheels 2 and 3 adapted to be run on the track rails which are to be tested, one of said rails being shown at 4. The means for magnetizing the rails may include, as diagrammatically shown, a pair of electro-magnets 5 and 6 which are suitably supported in suspension from the car body 1 respectively forwardly and rearwardly of the wheels 2, and which have their pole faces 7 and 8 reaching down close to the rail 4. By means of conductors 9 and 10, the coils 11 and 12 of the electro-magnets 5 and 6 are connected in parallel with a direct current generator 13 located within the body of the car. Suspended from the rear end of the car is a suitable magnetically-sensitive exploring unit or detector 14, which, through conductors 15 and 16, is connected in circuit with an amplifier 17 and a recorder 18 within the car body 1. Duplicates of the magnets 5 and 6 and the detector 14 may of course be employed at the opposite side of the car for testing the other rail (not shown) of the track.

With the apparatus so far described, and with the car travelling in the direction shown by the arrow, the effect of the electro-magnets 5 and 6 is to establish, as indicated in Fig. II, residual magnetic pole faces in the regions of internal hidden flaws A, as well as in the regions of wheel burns B and scale spots S at the surface of the rail. These magnetic faces in turn create residual flux fields such as conventionally indicated by the curved dotted arrows at F and F', in Fig. II. Accordingly, as the detector 14 passes through these localized magnetic flux fields F and F', the wheel burns B and the scale spots S are indicated by the recorder 19 together with the hidden flaws A with consequent confusion of recordings.

In order to prevent the recording of the surface imperfections in the rail, according to my invention I have provided means including an additional electro-magnet 20 which may be of the same general construction as the magnets 5 and 6 and suspended in a like manner from the car 1, but which is excited by alternating current from an alternating current generator 21 within the car 1. As shown, the magnet 20 is positioned immediately behind the magnet 6 and ahead of the detector 14 so that it acts upon the rail 4 after the latter has been magnetized as hereinbefore explained. Due to being alternating in its character, the flux produced by the electromagnet 20 will penetrate the rail 4 only to a certain depth and neutralize the pole faces previously set up in the regions of the surface imperfections B and S of the rail and so destroy the fluxes due to said faces without however affecting the fluxes F in the regions of the internal flaws A. As a result the rail is placed in the condition shown in Fig. III with active flux fields F remaining only at the regions of the hidden imperfections A. It therefore follows that as the detector 14 passes along the rail after the latter has been influenced by the alternating current magnet 20, only the hidden flaws A will be indicated by the recorder. In practice the depth to which the alternating flux of the magnet 20 penetrates the rail can be controlled by varying the frequency of the exciting current through changes in the speed of the alternator 21, or in any other manner within the knowledge of those skilled in the electrical arts. It is of course to be understood that the magnet 20 can be duplicated at the other side of the car when both track rails are to be tested at the same time.

Having thus described my invention, I claim:

1. The method of detecting hidden flaws in track rails and the like which comprises magnetizing the rail to establish residual magnetic faces and in turn create individual magnetic flux fields locally around the flaws within the rail; then destroying any residual flux incidentally set up locally at the regions of the surface irregularities such as wheel burns, shelly spots, etc., in the rail; and finally detecting the individual magnetic fluxes set up around them as aforesaid.

2. The method of detecting hidden flaws in track rails and the like which comprises magnetizing the rail to establish residual magnetic faces and in turn create individual magnetic flux fields locally around the flaws; then destroying any residual flux fields incidentally set up locally in the regions of surface irregularities such as wheel burns, shelly spots, etc., in the rail by subjecting the latter to an alternating magnetic flux which penetrates only to a predeterminable depth; and finally detecting the individual magnetic fluxes set up around them as aforesaid.

3. Apparatus for detecting hidden flaws in track rails and the like comprising means for magnetizing the rail to establish residual magnetic faces in the regions of the flaws with creation of individual localized magnetic flux fields at these regions; means for subsequently destroying any residual magnetic flux fields created in the regions of surface irregularities such as wheel burns, scale, shelly spots, etc., in the rail; and magnetically-sensitive detector means adapted to be passed along the rail for action thereupon by the flux around the flaws.

4. Apparatus for detecting hidden flaws in track rails or the like comprising means for magnetizing the rail to establish residual magnetic faces in the regions of the flaws with creation of individual local magnetic flux fields at these regions; means adapted to be passed along the rail thereafter and producing an alternating flux to destroy any residual magnetic flux fields initially created in the regions of surface irregularities such as wheel burns, scale, shelly spots, etc., in the rail; and magnetically sensitive detector means adapted to be finally passed along the rail for action thereupon by the flux around the flaws.

5. Apparatus for detecting hidden flaws in track rails or the like comprising a direct current excited electro-magnet adapted to be passed along the rail to magnetize it for establishment of residual magnetic faces in the regions of the flaws with creation of individual local magnetic flux fields at these regions; an alternating current-excited electro-magnet adapted to be next passed along the rail to destroy any residual magnetic flux fields initially created at the regions of surface irregularities such as wheel burns, scale, shelly spots, etc., on the rail; and a magnetically-sensitive detector means adapted to be finally passed along the rail for action thereupon by the flux around the flaws.

ARTHUR E. F. BILLSTEIN.